United States Patent Office 3,253,933
Patented May 31, 1966

3,253,933
GLASS COMPOSITIONS
Yves Georges Godron, Paris, France, assignor to Compagnie de Saint-Gobain, Neuilly-sur-Seine, France
No Drawing. Filed Dec. 18, 1961, Ser. No. 160,301
Claims priority, application France, Feb. 12, 1955, 685,509, Patent 1,121,659; May 11, 1955, addition 55,382, Patent 1,121,659
10 Claims. (Cl. 106—47)

This invention relates to new glasses, to new compositions of matter adapted to use in making glass, and to novel uses for such glass compositions. This case is a continuation-in-part of application Ser. No. 563,208 filed February 3, 1956, now abandoned.

It is an object of the invention to make non-siliceous phosphate glass or glass containing only little quantities of silica and impurities. Another object of the invention is to make a class of novel glasses the composition of which can be varied to produce different qualities. Thus, by adjustment of the quantity of certain elements present, or by the substitution of elements, it is possible to alter the fusibility, the resistance to chemical attack, or the tendency of the glass to devitrification. Further, by making other changes it is possible to increase or to reduce the resistance of the glass to chemical agents and atmospheric conditions.

Another object of the invention is to produce glasses suitable as enamels. It has been difficult to apply enamels to aluminum and its alloys and this object includes the production of glasses suitable for enameling those metals. Many of the glasses used in enameling were rich in lead and consequently toxic. It is an object of this invention to produce glasses suitable for enameling which are non-toxic.

Another object of the invention is to make high pressure lubricants suitable for use in the drawing of metals through dies and in other high temperature and high pressure operations involving friction, and particularly for use in the drawing of metals, including alloys which have relatively low points of fusion.

Another object is to make and use glasses as fertilizers and to prepare glassy fertilizers susceptible of good control of the rate of disintegration.

The objects of the invention are accomplished generally speaking by glasses having the compositions set forth hereinafter.

The basic constituents of these glasses, expressed in mole percentages include 40–50% of alkali metal oxide, 30–50% of phosphoric anhydride ($P_2O_5$), and 10–20% of alumina ($Al_2O_3$). In addition, the composition contains an oxide of divalent metal from the group zinc, calcium and magnesium, which should generally be present in a proportion of at least 2 moles per 100 moles of the three constituents first named. Generally the proportion of oxide of divalent metal to base composition is between 4 moles and 20 moles per 100 moles of the three constituents. It is preferred to have a proportion of oxide of divalent metal to base composition between 4 moles and 11 moles per 100 moles of the three constituents. It is also preferred to maintain the proportion of phosphoric anhydride ($P_2O_5$) in the basic constituents equal or superior to 34.5% in order to make the glasses without special precautions. When the phosphoric anhydride attains these values the rate of crystallization and consequently the rate of devitrification are perfectly compatible with the usual methods of making glass. The total amount of silica and impurities, such as $TiO_2$, $SO_3$ et al., is less than 4% by weight of the glass.

The preferred alkali metal oxide is sodium oxide ($Na_2O$). One can use also a mixture of sodium oxide ($Na_2O$) and potassium oxide ($K_2O$) or a mixture of sodium oxide, potassium oxide and lithium oxide ($Li_2O$). If desired, other alkali metal oxides or mixtures of them may also be utilized. By changing the percentage of the various alkali metal oxides in the composition, one may change the fusibility, the alterability, or the tendency toward devitrification.

It is also possible to replace a small amount of phosphoric anhydride with an equal quantity of boric anhydride ($B_2O_3$), and this increases the resistance of the glass to chemical reagents and atmospheric conditions. It is preferred to make substitution without lowering the minimum mole percentage of $P_2O_5$ so that the ratio between the molecular percentage of $P_2O_5$ and the molecular percent of $Al_2O_3$ remains at least equal to 1.5. A substitution of 5%, more or less, produces an effective change in quality of the products. The $B_2O_3$ is always less than 10% by weight of the total composition and preferably less than 5% by weight of the total composition.

It is also possible to alter the fusibility of the glass by replacing a small percentage of one or several basic constituents by an amount up to about 5% of the oxides of the group $R_2O_3$ other than $Al_2O_3$, R being a trivalent metal of the type of iron and chromium.

EXAMPLES

The following table gives five exemplary compositions and show their relative attackability by water, measured by the method of Deutsche Glass Technische Gesellschaft:

| Composition in moles | $P_2O_5$ | $Al_2O_3$ | $Na_2O$, $K_2O$ | ZnO | MgO | DGG |
|---|---|---|---|---|---|---|
| A | 36.45 | 13.65 | 49.9 | | | 2,940 |
| Ex. 1 | 36.45 | 13.65 | 49.9 | 5.0 | | 2,300 |
| B | 39.4 | 14.3 | 46.3 | | | 1,500 |
| Ex. 2 | 39.4 | 14.3 | 46.3 | 5.0 | | 150 |
| C | 40.2 | 14.8 | 45.0 | | | 80 |
| Ex. 3 | 40.2 | 14.8 | 45.0 | 5.5 | | 40 |
| Ex. 4 | 40.2 | 14.8 | 45.0 | | 10.2 | 60 |
| D | 41.45 | 14.85 | 43.7 | | | 60 |
| Ex. 5 | 41.45 | 14.85 | 43.7 | 5.05 | | 15 |

According to an important feature of the invention, all the glasses corresponding to the examples cited have an alumina weight percentage less than 20%; as can be calculated easily from the mole composition.

It is seen that glasses 1, 2, 3, 4, and 5 are less attackable than the same glasses deprived of the oxides of zinc or magnesium.

The attackability of glasses 3 and 5 are comparable to those of the siliceous glasses of industry. For example, bottle glass has an attackability of 15–30 DGG, and window glass has an attackability of 30–50 DGG. The resistance of phosphoric glasses 3 and 5 is therefore most remarkable.

The glasses within this invention which are the least attackable may advantageously be applied to enameling, particularly to enameling aluminum and its alloys. In fact, they are as fusible as the lead glasses and they are not toxic.

Enamel

The following proportion was successfully used in enameling. The parts by weight were as follows:

Hydrated trisodium phosphate _____ 67.2
Diammonia phosphate _____ 71.2
Hydrated alumina _____ 21.4
Potassium carbonate _____ 15.0
Magnesium carbonate _____ 7.85

This composition was melted at about 1000° C. in a silico-alumina refractory crucible, was poured on a table and had the composition of Example 4. When pulverized and reduced to a granular size (grains 0.15–0.30 mm.) it could be fritted into a disc of 80 x 3 mm. by heating for 30 minutes, at 405° C. It began to spread at 425° C. It is useful in enameling at 500° C.

The table hereinabove shows that the glasses according to this invention have a very large range of attackability. As, especially, a certain number of the constituents have fertilizer properties either as direct fertilizer containing $P_2O_5$ and $K_2O$ in adequate quantities, or as adjuvants (CaO, MgO) or as minor elements (ZnO), these glasses are particularly adapted to use in agriculture either as supports or as fertilizers.

One may choose from among them, as a function of their solubility, the fertilizers or supports for minor elements which are best adapted to the needs of the soil that is to be treated.

Fertilizer

| | Parts by weight |
|---|---|
| Hydrated trisodium phosphate | 81.6 |
| Diammonia phosphate | 61.0 |
| Hydrated alumina | 20.45 |
| Potassium carbonate | 14.1 |
| Zinc oxide | 3.85 |

This mixture was melted at 1000° C. in a crucible of silico-alumina refractory and poured on a table, producing a glass of the composition of Example 1. This glass has the attackability of 2300 DGG and is useful in agriculture as a fertilizer or as a support for minor elements.

Metal drawing

It is known that the drawing of non-ferrous metals and alloys presents great difficulties which arise principally from the high friction which develops between the ingot and the tools of the press. These high degrees of friction develop local rises in the temperature of the ingot and these produce defects in the drawn pieces. Furthermore, by reason of this friction, the central part of the ingot moves faster than the parts in contact with the tools of the press and it follows that local high tensions produce a heterogeneity of structure which is characterized by the appearance of large grains in the periphery of the drawn product.

The classical method of improving these conditions consists in considerably reducing the speed of drawing, e.g. reducing it below 3 meters per minute in order to permit the heat released by friction to dissipate itself in the machinery. However, in addition to lowering the productivity of the press, that method does not permit one to avoid the appearance of large external grains in the periphery nor the formation of a central cavity.

There has also been described a process of drawing, at higher temperature, metals which are hard to draw, in which one interposes between the ingot and the tools of the press, in particular the die, some material which will melt partially or wholly under the effect of the heat of the ingot, while remaining viscous. Examples of such materials are glass, an oxide, a salt, or a slag.

The applicant has demonstrated, and this constitutes another object of the present invention, that the compositions of glass according to the foregoing description have a viscosity which makes them suitable for use as lubricants in the temperature interval between about 400° and 650° C. and that they may be used as drawing lubricants for metals or alloys of low fusion point, and particularly for aluminum and aluminum alloys. For those alloys the temperature attained by the lubricant during the drawing is within that interval. The sintering temperature of these compositions is itself between about 380° and 460° C.

In applying the glasses described herein to the drawing of metals one obtains interesting and valuable results, the metals, particularly the light alloys specifically mentioned herein, may be drawn at high speed, the speeds of drawing attaining from 15 to 50 meters per minute; large grains do not appear in the periphery during the heat treatment following the drawing; the drawing is accomplished without the production of a hollow part in the rod, so that the extruded piece is solid from end to end.

The glasses utilized have the advantage of easy removal from the surface of the object. This is accomplished by simple immersion in water. In certain cases, notably when the glasses contain zinc oxide, one may slightly acidify the water which is used for washing, for instance by the addition of a small amount of nitric acid, to secure speed of removal.

*Ex. 6.*—The following lubricant, containing in moles:

$P_2O_5$, 34.9; $Al_2O_3$, 15.9; $Na_2O$, 49.2; and ZnO, 4.7 was used for the extrusion of an aluminum alloy containing copper 4.25% by weight, manganese .75% by weight, magnesium .5% by weight, silicon .75% by weight. The temperature of sintering of this glass composition is about 390° C. The speed of drawing was 24 meters per minute. The product drawn had no central recess at the end and neither the drawing nor the subsequent thermal treatments produced large grains in the periphery.

As many apparently widely different embodiments of the present invention may be made without departing from the spirit and scope thereof it is to be understood that the invention is not limited to the specific embodiments.

What is claimed is:

1. Phosphate glass consisting essentially of a ternary composition of alkali metal oxide, $P_2O_5$ and $Al_2O_3$, in the proportions of alkali metal oxide 40 to 50 mole percent, $P_2O_5$ 34.5 to 50 mole percent, $Al_2O_3$ 10 to 20 mole percent, and, for 100 moles of the basic composition, 2 to 20 moles of at least one divalent metal oxide from the class consisting of CaO, ZnO, and MgO, the molecular ratio of $P_2O_5$ to $Al_2O_3$ being not less than 1.5 to 1, the content of $Al_2O_3$ being less than 20% by weight of the glass, and the total amount of impurities being less than 4% of the weight of the glass.

2. The glass of claim 1 containing in the basic composition not over 10 mole percent of $B_2O_3$, the molar content of $P_2O_5$ plus $B_2O_3$ in said basic composition not exceeding 50 mole percent.

3. The glass of claim 1 containing in the basic composition not over 5 mole percent of $R_2O_3$, R being trivalent metal from the group consisting of Fe and Cr.

4. Glass having the composition of claim 1 in which the alkali metal oxide is sodium oxide.

5. Glass having the composition of claim 1 in which the alkali metal oxide is potassium oxide.

6. Glass consisting in its essential elements of about 40.2 mole percent $P_2O_5$, 14.8 mole percent $Al_2O_3$, 45 mole percent of at least one oxide from the group consisting of $Na_2O$ and $K_2O$, and for each 100 moles of the foregoing, about 5.5 moles of ZnO, and not over 4 weight percent of impurities.

7. Glass consisting in its essential elements of about 41.45 mole percent $P_2O_5$, 14.85 mole percent $Al_2O_3$, 43.7 mole percent of at least one of the group consisting of $Na_2O$ and $K_2O$, and for each 100 moles of the foregoing, about 5 moles ZnO, and not over 4% by weight of impurities.

8. Glass consisting in its essential elements of about 36.45 mole percent $P_2O_5$, 13.65 mole percent $Al_2O_3$, 49.9 mole percent of at least one of the group consisting of $Na_2O$ and $K_2O$, and for each 100 moles of the foregoing, about 5 moles ZnO.

9. Glass consisting in its essential elements of about 34.9 mole percent $P_2O_5$, 15.9 mole percent $Al_2O_3$, 49.2 mole percent $Na_2O$ and for each 100 moles of the foregoing, about 4.7 moles ZnO.

10. Phosphate glass consisting essentially of 40 to 50 mole percent alkali metal oxide, 34.5 to 50 mole percent $P_2O_5$, 10 to 20 mole percent $Al_2O_3$, and for 100 moles of the foregoing 4 to 11 moles of at least one of the group consisting of CaO, MgO, and ZnO, the mole ratio of $P_2O_5$ to $Al_2O_3$ being not less than 1.5 to 1, the content of $Al_2O_3$ being less than 20% of the weight of the glass, the total impurities being less than 4% of the weight of the glass.

References Cited by the Examiner

UNITED STATES PATENTS

| | | | |
|---|---|---|---|
| 1,964,629 | 6/1934 | Grimm et al. | 106—47 |
| 2,227,082 | 12/1940 | Grimm et al. | 106—47 |
| 2,288,418 | 6/1942 | Partridge | 71—34 X |
| 2,732,290 | 1/1956 | Vana et al. | 71—1 |
| 2,750,270 | 6/1956 | Barnes | 71—34 |
| 2,751,312 | 6/1956 | Ness | 117—53 |
| 2,827,393 | 3/1958 | Kadisch et al. | 117—129 |
| 2,866,713 | 12/1958 | Allen | 196—48 |
| 2,916,388 | 12/1959 | Earl | 106—49 |
| 2,920,972 | 1/1960 | Godron | 106—47 |
| 2,971,644 | 2/1961 | Cejournet | 207—10.1 |
| 3,021,941 | 2/1962 | Huet | 205—21.1 |
| 3,029,140 | 4/1962 | Hemwall | 71—33 |
| 3,041,201 | 6/1962 | Roelofs | 117—129 |
| 3,075,637 | 1/1963 | Bean et al. | 205—21.1 |

FOREIGN PATENTS

| | | |
|---|---|---|
| 498,049 | 1/1939 | Great Britain. |
| 728,808 | 4/1955 | Great Britain. |
| 829,774 | 3/1960 | Great Britain. |

OTHER REFERENCES

Tooley: Handbook of Glass Manufacture (2nd ed., 1957), pub. by Ogden Publ. Co., N.Y.C. (page 3).

TOBIAS E. LEVOW, *Primary Examiner.*

H. McCARTHY, *Assistant Examiner.*